United States Patent [19]

Takada

[11] Patent Number: 5,717,539
[45] Date of Patent: Feb. 10, 1998

[54] TAPE LOADING MECHANISM FOR MAGNETIC RECORDING AND REPRODUCING APPARATUS

[75] Inventor: Hiroyuki Takada, Fujisawa, Japan

[73] Assignee: Victor Company of Japan, Ltd., Japan

[21] Appl. No.: 522,922

[22] Filed: Sep. 1, 1995

[30] Foreign Application Priority Data

Sep. 22, 1994 [JP] Japan .................. 6-254836

[51] Int. Cl.⁶ .................................................. G11B 5/027
[52] U.S. Cl. .................................................. 360/85
[58] Field of Search ................................ 360/85, 95

[56] References Cited

U.S. PATENT DOCUMENTS

| | | | |
|---|---|---|---|
| 5,093,752 | 3/1992 | Sato et al. | 360/85 |
| 5,115,361 | 5/1992 | Terayama et al. | 360/85 |
| 5,128,815 | 7/1992 | Leonhardt et al. | 360/85 |

FOREIGN PATENT DOCUMENTS 2-126460  5/1990  Japan .

*Primary Examiner*—Stuart S. Levy
*Assistant Examiner*—William J. Klimowicz
*Attorney, Agent, or Firm*—Rossi & Associates

[57] ABSTRACT

A tape loading mechanism is designed for an apparatus operating on a magnetic tape at least partially in a tape cassette and including a rotary drum. In the tape loading mechanism, first tape guides move to draw a portion of the magnetic tape from the tape cassette. In addition, second tape guides move to wrap the magnetic-tape portion, which is drawn from the tape casette, in a helix around the rotary drum. The first tape guides and the second tape guides cooperate with each other to hold substantially constant a length of the magnetic-tape portion which is drawn from the tape cassette.

3 Claims, 9 Drawing Sheets

TAPE LOADING MECHANISM FOR MAGNETIC RECORDING AND REPRODUCING APPARATUS

BACKGROUND OF THE INVENTION

1. Field of the Invention

This invention relates to a tape loading mechanism for a magnetic-tape drive apparatus, a magnetic recording apparatus, a magnetic reproducing apparatus, or a magnetic recording and reproducing apparatus.

2. Description of the Prior Art

In some magnetic recording and reproducing apparatuses such as video tape recorders (VTR's) or digital audio tape recorders (DAT's), a portion of a magnetic tape is moved out of a cassette before being wrapped in a helix around a rotary drum through a given angular range. A magnetic head or heads rotate together with the rotary drum, scanning the magnetic tape in a slant format to record and reproduce information on and from the magnetic tape.

Such a magnetic recording and reproducing apparatus has a tape loading mechanism which serves to move a portion of a magnetic tape into engagement with a rotary drum. As will be described later, a prior art tape loading mechanism tends to damage a magnetic tape in the presence of a back tension applied to the magnetic tape.

SUMMARY OF THE INVENTION

It is an object of this invention to provide an improved tape loading mechanism for a magnetic-tape drive apparatus, a magnetic recording apparatus, a magnetic reproducing apparatus, or a magnetic recording and reproducing apparatus.

A first aspect of this invention provides a tape loading mechanism for an apparatus operating on a magnetic tape at least partially in a tape cassette and including a rotary drum, the mechanism comprising first tape guides moving to draw a portion of the magnetic tape from the tape cassette; and second tape guides moving to wrap the magnetic-tape portion, which is drawn from the tape casette, in a helix around the rotary drum; wherein the first tape guides and the second tape guides cooperate with each other to hold substantially constant a length of the magnetic-tape portion which is drawn from the tape cassette.

A second aspect of this invention provides a tape loading mechanism for an apparatus operating on a magnetic tape at least partially in a tape cassette and including a rotary drum, the mechanism comprising first movable tape guides drawing a portion of the magnetic tape from the tape cassette as the first tape guides move from their first given positions to their second given positions; and second movable tape guides contacting and then forcing the magnetic-tape portion, which is drawn from the tape casette, as the second tape guides move from their first given positions to their second given positions, the second tape guides wrapping the magnetic-tape portion in a helix around the rotary drum; wherein the first tape guides move back from their second given positions toward their first given positions to hold substantially constant a length of the magnetic-tape portion drawn from the tape cassette as the second tape guides contact and then force the magnetic-tape portion.

A third aspect of this invention is based on the second aspect thereof, and provides a tape loading mechanism wherein the second tape guides follow the first tape guides.

A fourth aspect of this invention is based on the second aspect thereof, and provides a tape loading mechanism further comprising movable inclined poles contacting and then forcing the magnetic-tape portion, which is drawn from the tape casette, as the inclined poles move from their first given positions to their second given positions, the inclined poles cooperating with the second tape guides to wrap the magnetic-tape portion in the helix around the rotary drum, wherein the first tape guides move back from their second given positions toward their first given positions to hold substantially constant the length of the magnetic-tape portion drawn from the tape cassette as the inclined poles and the second tape guides contact and then force the magnetic-tape portion.

DESCRIPTION OF THE PREFERRED EMBODIMENT

Before a description of an embodiment of this invention, a prior-art tape loading mechanism will be described for a better understanding of this invention.

Figure 1:
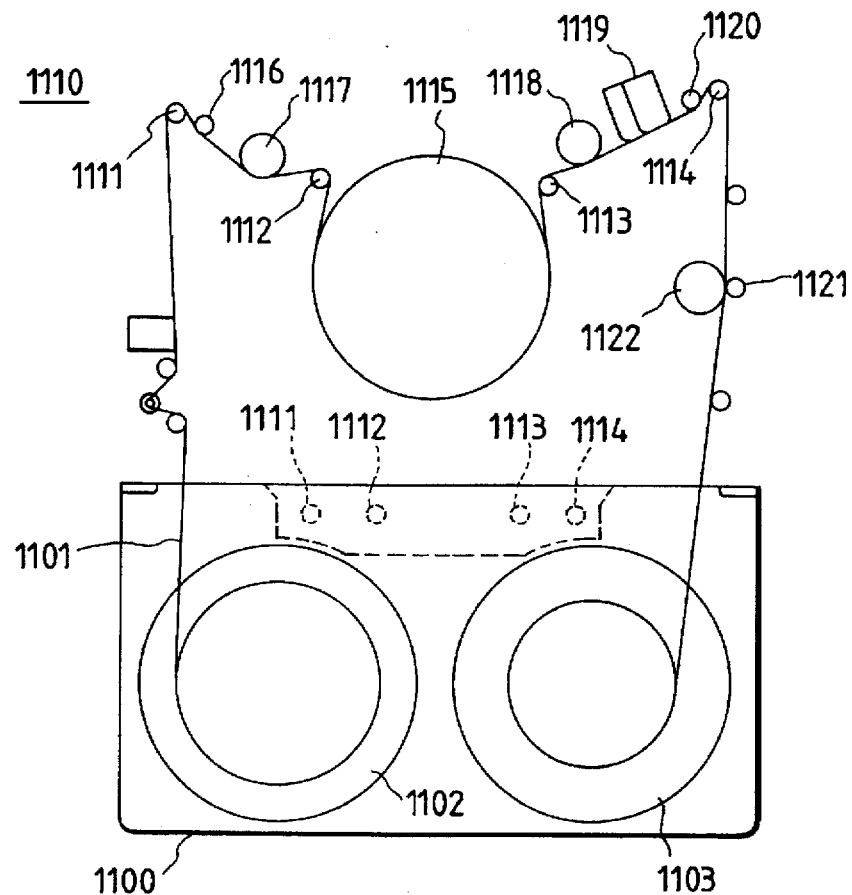
FIG. 1 is a diagram of a prior-art VTR.
Figure 2:
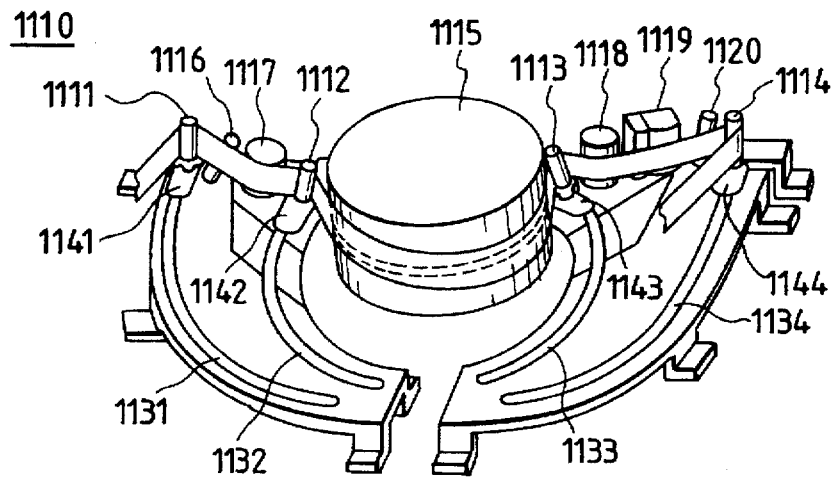
FIG. 2 is a perspective view of a part of the prior-art VTR.

FIGS. 1 and 2 show a prior-art tape loading mechanism for a VTR 110 which is disclosed in Japanese published unexamined patent application 2-126460.

With reference to FIG. 1, the prior-art tape loading mechanism operates on a tape cassette 1100 placed in the VTR 1110. The tape cassette 1100 has a supply reel 1102 and a take-up reel 1103. The tape cassette 1100 contains a magnetic tape 1101 wound around the supply reel 1102 and the take-up reel 1103.

A supply side of the VTR 1110 includes guide rollers 1111 and 1112 which can move between the tape cassette 1100 and a side of a rotary drum 1115. The guide roller 1112 has a width-limiting function. Similarly, a take-up side of the VTR 1110 includes guide rollers 1113 and 1114 which can move between the tape cassette 1100 and a side of the rotary drum 1115. The guide roller 1113 has a width-limiting function.

The supply side of the VTR 1110 includes an inclined guide 1116 and an impedance roller 1117. The take-up side of the VTR 1110 includes an impedance roller 1118, an audio control head 1119, an inclined guide 1120, a capstan 1121, and a pinch roller 1122.

As shown in FIG. 2, the guide rollers 1111 and 1114 are supported on loading bases 1141 and 1144 which can move along guide grooves 1131 and 1134 respectively. The guide grooves 1131 and 1134 are approximately parallel with a flat plane of a chassis of the VTR 1110. The guide rollers 1112 and 1113 are supported on loading bases 1142 and 1143 which can move along guide grooves 1132 and 1133 respectively. The guide grooves 1132 and 1133 have first portions closer to the tape cassette 1100. The first portions of the guide grooves 1132 and 1133 are approximately parallel with the flat plane of the chassis of the VTR 1110. The guide grooves 1132 and 1133 have second portions near the rotary drum 1115. The second portions of the guide grooves 1132 and 1133 are connected to the first portions thereof. The second portions of the guide grooves 1132 and 1133 are inclined with respect to the flat plane of the chassis of the VTR 1110.

During a tape loading process, a portion of the magnetic tape 1101 is moved out of the tape cassette 1100 by the guide rollers 1111–1114 before being wrapped in a helix around the rotary drum 1115 through a given angular range. To prevent the portion of the magnetic tape 1101 from being slacked by reel inertia, a back tension is generally applied to the magnetic tape 1101.

In the case where a capstan motor (not shown) is connected to a reel disk to drive the latter, a typical method of applying a back tension to the magnetic tape 1101 has a step of braking the reel disk. In the case where a reel motor (not shown) is directly coupled to a reel disk to drive the latter, a general method of applying a back tension to the magnetic tape 1101 has a step of electrically controlling the reel motor.

During a former stage of the tape loading process, since the guide rollers 1111–1114 move along portions of the guide grooves 1131–1134 which are approximately parallel with the flat plane of the chassis of the VTR 1110, the magnetic-tape portion outside the tape cassette 1100 is neither twisted nor subjected to a height variation. On the other hand, during a latter stage of the tape loading process, the guide rollers 1112 and 1113 move along the inclined portions of the guide grooves 1132 and 1133 while the guide rollers 1111 and 1114 move along the guide grooves 1131 and 1134 which are approximately parallel with the flat plane of the chassis of the VTR 1110. Accordingly, the magnetic-tape portion outside the tape cassette 1100 is appreciably twisted and is subjected to a considerable height variation. In the presence of a back tension applied to the magnetic tape 1101, the twist and the height variation tend to cause damage to the magnetic tape 1101.

First Embodiment

Figure 3:
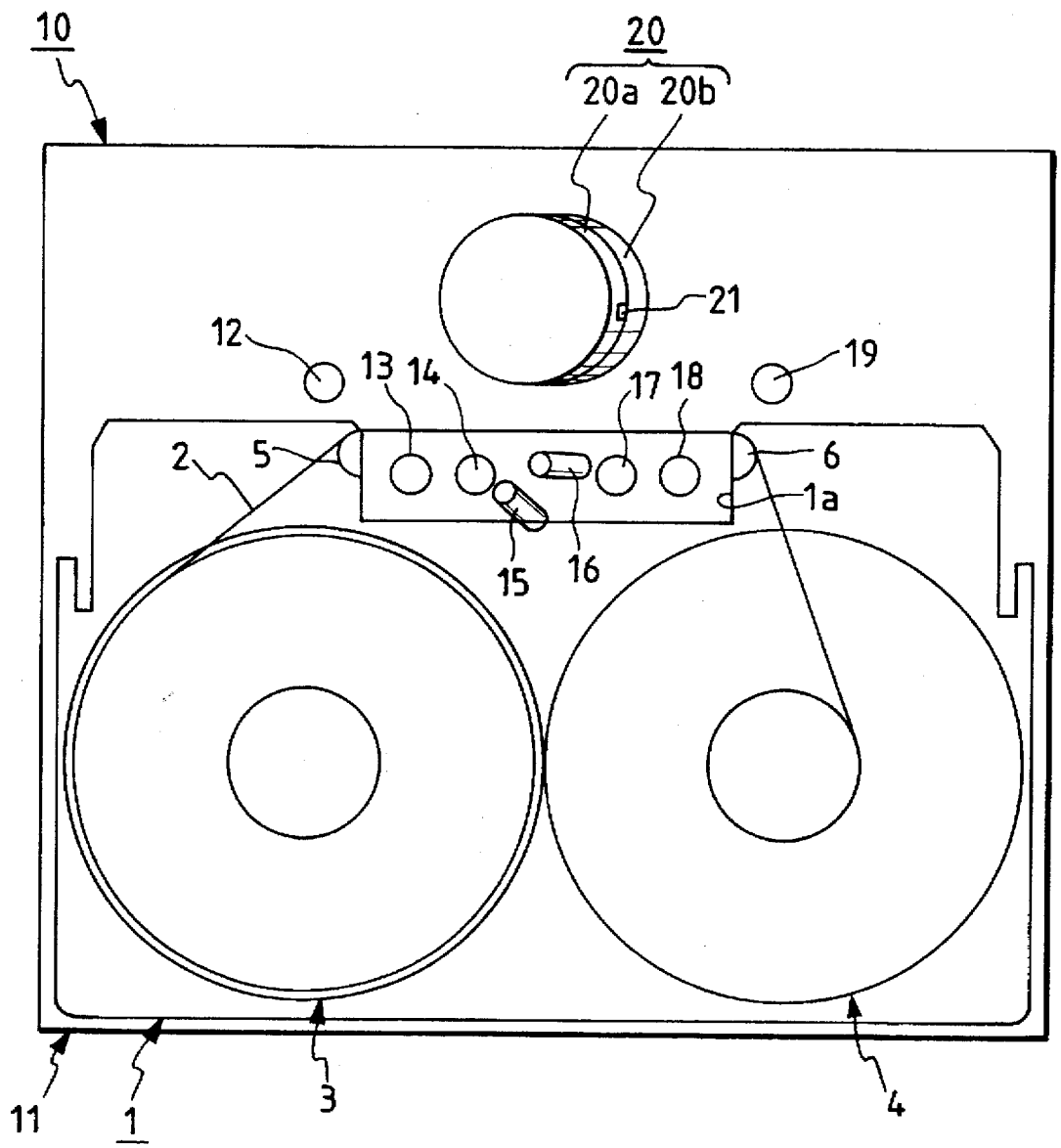
FIG. 3, FIG. 4, and FIG. 5 are diagrams of a magnetic recording and reproducing apparatus in different states respectively, the magnetic recording and reproducing apparatus including a tape loading mechanism according to a first embodiment of this invention.
Figure 4:
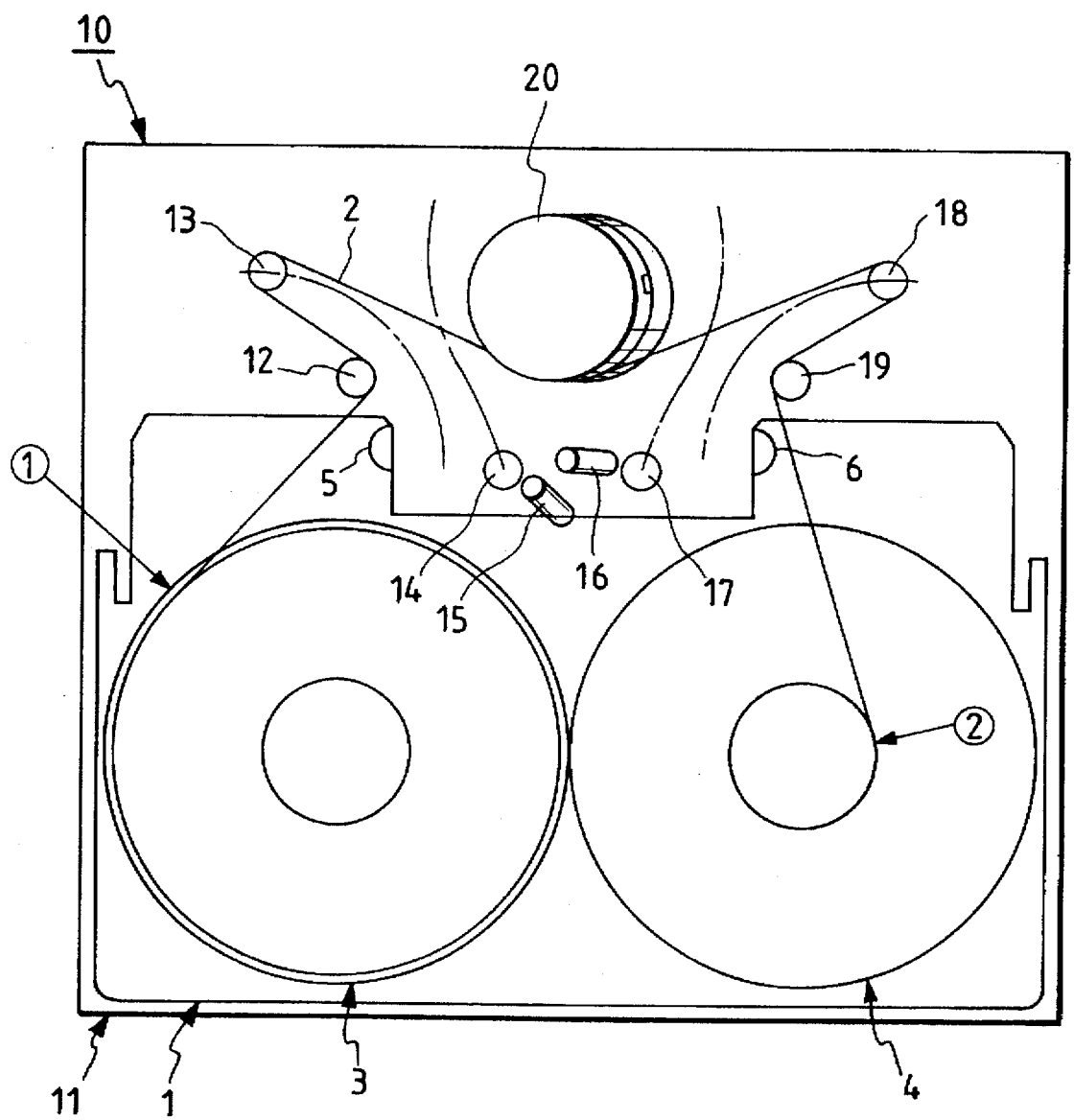
Figure 5:
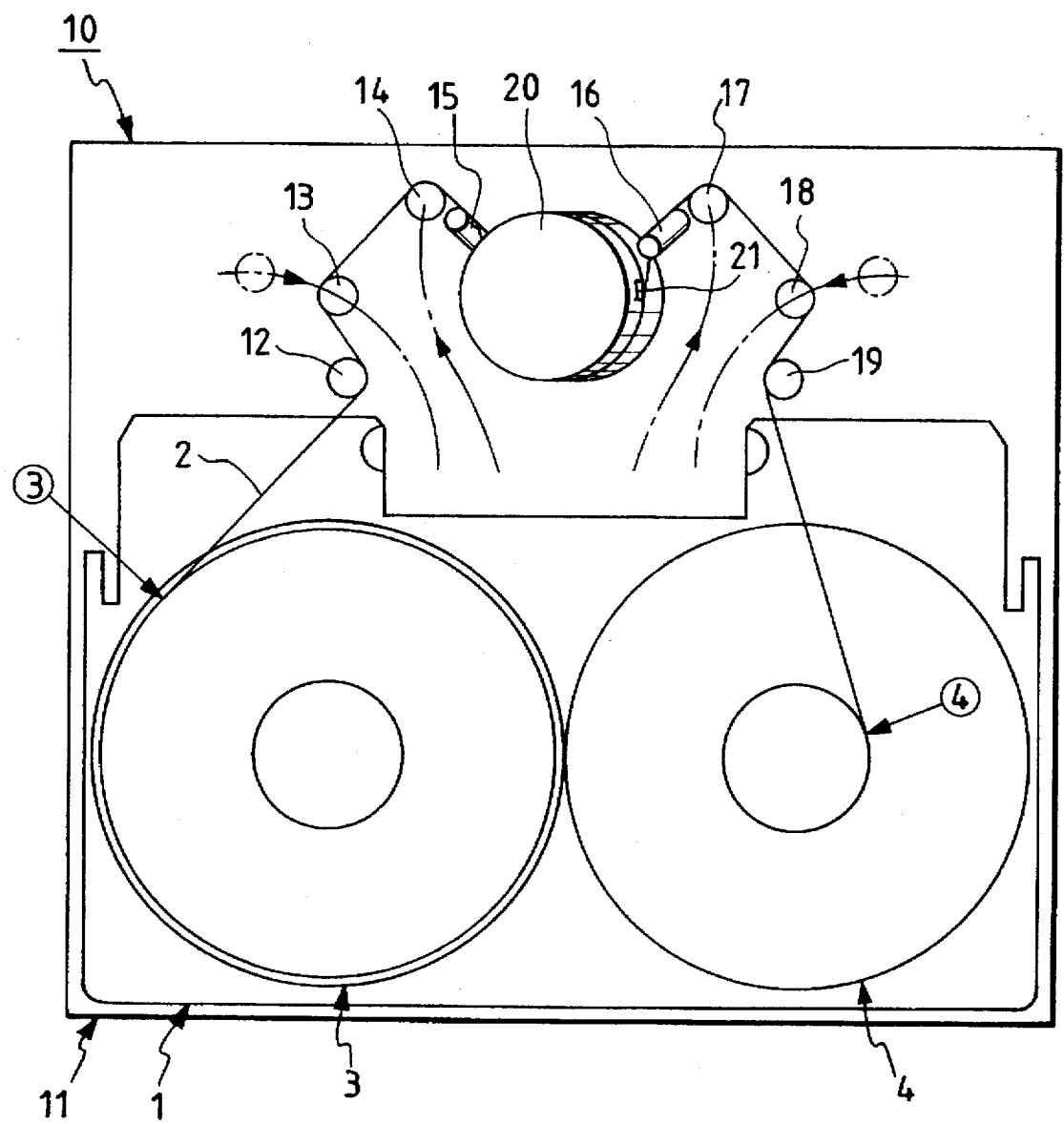

A first embodiment of this invention will now be described. FIGS. 3, 4, and 5 show a tape loading mechanism for a magnetic recording and reproducing apparatus 10 according to a first embodiment of this invention.

With reference to FIG. 3, a front area within the magnetic recording and reproducing apparatus 10 accommodates a tape cassette 1 placed on a chassis base 11. The tape cassette 1 contains a magnetic tape 2. The tape cassette 1 has a supply reel 3 and a take-up reel 4 around which the magnetic tape 2 is wound. A fore portion of the tape cassette 1 is provided with poles 5 and 6 of a semicircular cross-section at supply and take-up sides respectively. In addition, the fore portion of the tape cassette 1 has a loading pocket 1a extending between the semicircular poles 5 and 6. The loading pocket 1a has an open bottom. During tape unloading conditions which occur before a tape loading process, the magnetic tape 2 extends from the supply reel 3 to the supply-side semicircular pole 5, and then extends between the supply-side semicircular pole 5 and the take-up-side semicircular pole 6. Subsequently, the magnetic tape 2 extends from the take-up-side semicircular pole 6 to the take-up reel 4.

As will be made clear later, an area within the magnetic recording and reproducing apparatus 10 which confronts the tape cassette 1 is provided with supply-side and take-up-side parts of the tape loading mechanism.

The magnetic recording and reproducing apparatus 10 has a tape guide 12 mounted on the chassis base 11 at a location outside the tape cassette 1. The location of the tape guide 12 is in front of a left-hand region of the fore part of the tape cassette 1. The tape guide 12 corresponds to a supply-reel side of the tape cassette 1.

With reference to FIG. 3, the magnetic recording and reproducing apparatus 10 has tape guides 13 and 14 and an inclined pole 15 extending into the loading pocket 1a of the tape cassette 1. The tape guides 13 and 14 and the inclined pole 15 are sequentially arranged in a left-hand half of the loading pocket 1a. The tape guide 13 has a tape drawing function. The tape guide 13 is supported on a loading arm (not shown) or a loading base (not shown). The tape guide 13 can move between a first given position in the loading pocket 1a of the tape cassette 1 and a second given position outside the tape cassette 1. The second given position of the tape guide 13 is in a left-hand side of a rotary drum 20 and beyond the tape guide 12. The tape guide 14 has a tape wrapping function. The tape guide 14 and the inclined pole 15 are supported on loading bases (not shown). The tape guide 14 can move between a first given position in the loading pocket 1a of the tape cassette 1 and a second given position outside the tape cassette 1. The second given position of the tape guide 14 is in a left-hand side of the rotary drum 20. The inclined pole 15 can move between a first given position in the loading pocket 1a of the tape cassette 1 and a second given position outside the tape cassette 1. The second given position of the inclined pole 15 is in a left-hand side of the rotary drum 20.

The magnetic recording and reproducing apparatus 10 has a tape guide 19 mounted on the chassis base 11 at a location outside the tape cassette 1. The location of the tape guide 19 is in front of a right-hand region of the fore part of the tape cassette 1. The tape guide 19 corresponds to a take-up-reel side of the tape cassette 1.

With reference to FIG. 3, the magnetic recording and reproducing apparatus 10 has an inclined pole 16 and tape guides 17 and 18 extending into the loading pocket 1a of the tape cassette 1. The inclined pole 16 and the tape guides 17 and 18 are sequentially arranged in a right-hand half of the loading pocket 1a. The tape guide 17 has a tape wrapping function. The inclined pole 16 and the tape guide 17 are supported on loading bases (not shown). The inclined pole 16 can move between a first given position in the loading pocket 1a of the tape cassette 1 and a second given position outside the tape cassette 1. The second given position of the inclined pole 16 is in a right-hand side of the rotary drum 20. The tape guide 17 can move between a first given position in the loading pocket 1a of the tape cassette 1 and a second given position outside the tape cassette 1. The second given position of the tape guide 17 is in a right-hand side of the rotary drum 20. The tape guide 18 has a tape drawing function. The tape guide 18 is supported on a loading arm (not shown) or a loading base (not shown). The tape guide 18 can move between a first given position in the loading pocket 1a of the tape cassette 1 and a second given position outside the tape cassette 1. The second given position of the tape guide 18 is in a right-hand side of the rotary drum 20 and beyond the tape guide 19.

In the case where the tape guides 13 and 18 are supported on loading arms, the tape guides 13 and 18 can rotate in a plane approximately parallel with a flat plane of the chassis base 11. On the other hand, in the case where the tape guides 13 and 18 are supported on loading bases, the tape guides 13 and 18 can move along guide grooves (not shown) approximately parallel with a flat plane of the chassis base 11.

As previously described, the tape guide 14, the inclined pole 15, the inclined pole 16, and the tape guide 17 are supported on the loading bases. The tape guide 14, the inclined pole 15, the inclined pole 16, and the tape guide 17 can move along guide grooves (not shown). The guide grooves for the tape guides 14 and 17 and the inclined poles 15 and 16 have first portions closer to the tape cassette 1. The first portions of the guide grooves are approximately parallel with the flat plane of the chassis base 11. The guide grooves for the tape guides 14 and 17 and the inclined poles 15 and 16 have second portions near the rotary drum 20. The second portions of the guide grooves are connected to the first portions thereof. The second portions of the guide grooves are inclined with respect to the flat plane of the chassis base 11.

Suitable drive arrangements (not shown) for the members 13–18 are designed to provide the following functions. During a tape loading process, motions of the tape guides 13 and 18 precede motions of the other members 14–17. As the tape guides 13 and 18 move from their first given positions in the loading pocket 1a of the tape cassette 1 to their second given positions outside the tape cassette 1, the tape guides 13 and 18 contact the magnetic tape 2 and then force the magnetic tape 2 out of the tape cassette 1. As will be described later, after the tape guides 13 and 18 reach the second given positions, the tape guides 13 and 18 slightly move back from the second positions toward the first positions to hold substantially constant the length of the portion of the magnetic tape 2 which extends outside the tape cassette 1 (that is, the length of the magnetic-tape portion drawn from the tape cassette 1).

The tape guides 14 and 17 and the inclined poles 15 and 16 follow the tape guides 13 and 18, moving from their first given positions in the loading pocket 1a of the tape cassette 1 toward their second given positions outside the tape cassette 1. It should be noted that until the tape guides 13 and 18 complete steps of drawing the magnetic tape 1 from the tape cassette 1, the tape guides 14 and 17 and the inclined poles 15 and 16 remain separate from the magnetic tape 2. After the tape guides 13 and 18 complete the steps of drawing the magnetic tape 1 from the tape cassette 1, the tape guides 14 and 17 and the inclined poles 15 and 16 contact the magnetic tape 2 and then wrap the magnetic tape 2 in a helix around the rotary drum 20 through a given angular range. In addition, the tape guides 14 and 17 and the inclined poles 15 and 16 cooperate with the tape guides 13 and 18 to hold substantially constant the length of the portion of the magnetic tape 2 which extends outside the tape cassette 1 (that is, the length of the magnetic-tape portion drawn from the tape cassette 1).

The rotary drum 20 is located at a position inside the magnetic recording and reproducing apparatus 10. The rotary drum 20 confronts the fore part of the tape cassette 1. The rotary drum 20 has an upper drum member 20a and a lower drum member 20b coaxially combined with each other. The upper drum member 20a can rotate counterclockwise together with a magnetic head or heads 21. The lower drum 20b has a leading portion (not shown) for guiding the magnetic tape 2 in a helical path. The lower drum 20b is fixedly located within the magnetic recording and reproducing apparatus 10.

It should be noted that a take-up side of the magnetic recording and reproducing apparatus 10 has a capstan (not shown) and a pinch roller (not shown) which compose a drive source for moving the magnetic tape 2.

Hereinafter, the tape unloading conditions and the tape loading process will be described in more detail. The tape unloading conditions precede the tape loading process. As shown in FIG. 3, during the tape unloading conditions, the tape guide 13, the tape guide 14, the inclined pole 15, the inclined pole 16, the tape guide 17, and the tape guide 18 are in their first given positions within the loading pocket 1a of the tape cassette 1. In other words, the members 13–18 are in their stand-by states. The tape guide 13, the tape guide 14, the inclined pole 15, the inclined pole 16, the tape guide 17, and the tape guide 18 are sequentially arranged in that order. During the tape unloading conditions, the magnetic tape 2 is separate from the members 13–18. Specifically, the magnetic-tape portion which extends between the semicircular poles 5 and 6 occupies a region in front of the members 13–18.

The tape loading process will now be described with reference to FIG. 4. When the tape loading process is started, the tape guides 13 and 18 for drawing the magnetic tape 2 move from their first given positions (their stand-by positions) in the loading pocket 1a of the tape cassette 1 to their second given positions outside the tape cassette 1 along paths approximately parallel with the flat plane of the chassis base 11. The second given positions of the tape guides 13 and 18 are beyond the tape guides 12 and 19 respectively. As previously described, the motions of the tape guides 13 and 18 precede the motions of the tape guides 14 and 17 and the inclined poles 15 and 16. During the movements of the tape guides 13 and 18 from their first given positions to their second given positions, the tape guides 13 and 18 contact the magnetic tape 2 and then force the magnetic tape 2 out of the tape cassette 1. While the tape guides 13 and 18 force the magnetic tape 2, the distance between the tape guides 13 and 18 increases. The second given positions of the tape guides 13 and 18 are in the left-hand side and the right-hand side of the rotary drum 20 respectively. In this way, the magnetic tape 2 is drawn from the tape cassette 1. It is preferable that the magnetic tape 2 is wrapped around the rotary drum 20 through a given small angular range when the step of drawing the magnetic tape 2 from the tape cassette 1 has been completed. It is also good that the magnetic tape 2 is not wrapped around the rotary drum 20 at all when the step of drawing the magnetic tape 2 from the tape cassette 1 has been completed. The length of the magnetic tape 2 between a point ① of contact with the supply reel 3 and a point ② of contact with the take-up reel 4 is equal to a given value L when the step of drawing the magnetic tape 2 from the tape cassette 1 has been completed.

During the step of drawing the magnetic tape 2 from the tape cassette 1, a suitable back tension is applied to the magnetic tape in a known way to prevent the magnetic tape 2 from being slacked by reel inertia. In the case where a capstan motor (not shown) is connected to a reel disk to drive the latter, the application of a back tension to the magnetic tape 2 is executed by braking the reel disk. In the case where a reel motor (not shown) is directly coupled to a reel disk to drive the latter, the application of a back tension to the magnetic tape 2 is executed by electrically controlling the reel motor. During the step of drawing the magnetic tape 2 from the tape cassette 1, the tape guides 13 and 18 move along the paths approximately parallel with the flat plane of the chassis base 11. In addition, the magnetic tape 2 is wrapped around the rotary drum 20 through the small angular range or is not wrapped therearound at all. Accordingly, the magnetic-tape portion outside the tape cassette 1 is hardly twisted. The tape guides 13 and 18 hardly subject the magnetic-tape portion outside the tape cassette 1 to a height variation. Thus, damage to the magnetic tape 2 can be prevented during the step of drawing the magnetic tape 2 from the tape cassette 1.

During the step of drawing the magnetic tape 2 from the tape cassette 1, the tape guides 14 and 17 and the inclined poles 15 and 16 follow the tape guides 13 and 18 by given short time lags, and hence move from their first given positions (their stand-by positions) in the loading pocket 1a of the tape cassette 1 toward their second given positions outside the tape cassette 1. The paths of former stages of the movements of the members 14–17 are approximately parallel with the flat plane of the chassis base 11. During the step of drawing the magnetic tape 2 from the tape cassette 1, the tape guides 14 and 17 and the inclined poles 15 and 16 remain separate from the magnetic tape 2.

After the step of drawing the magnetic tape 2 from the tape cassette 1 has been completed, the tape guides 14 and 17 and the inclined poles 15 and 16 maintain the movements toward their second given positions and thus contact the magnetic tape 2. Then, the members 14–17 force the magnetic tape 2 as they move to the second given positions. With reference to FIG. 5, the tape guides 13 and 18 move back from their second given positions toward their first given positions as the members 14–17 force the magnetic tape 2. Accordingly, the length of the magnetic tape 2 between the supply reel 3 and the take-up reel 4 remains equal to the given length of value L, and the magnetic tape 2 is prevented from slacking.

The tape guides 14 and 17 and the inclined poles 15 and 16 move along the paths inclined with respect to the flat plane of the chassis base 11 before they reach their second given positions. When the members 14–17 assume their second given positions as shown in FIG. 5, the magnetic tape 2 is wrapped in a helix around the rotary drum 20 through the given angular range. Thus, a step of wrapping the magnetic tape 2 around the rotary drum 20 has been completed. This means the completion of the tape loading process. The length of the magnetic tape 2 between a point ③ of contact with the supply reel 3 and a point ④ of contact with the take-up reel 4 is equal to the given length of value L when the step of wrapping the magnetic tape 2 around the rotary drum 20 has been completed. Then, the magnetic head or heads 21 which rotate together with the upper drum member 20a scan the magnetic tape 2 in a slant format to record and reproduce information on and from the magnetic tape 2.

During the interval between the moment of the completion of the tape drawing step to the moment of the completion of the tape wrapping step, since the length of the magnetic tape 2 between the supply reel 3 and the take-up reel 4 remains substantially equal to the given length of value L, the supply reel 3 and the take-up reel 4 do not rotate and the magnetic tape 2 is prevented from slacking. A very weak back tension applied to the magnetic tape 2 suffices to prevent the occurrence of the slack thereof. Even if the magnetic-tape portion outside the tape cassette 1 is appreciably twisted and is subjected to a considerable height variation during a final stage of the tape loading process, the very weak back tension enables the prevention of damage to the magnetic tape 2.

An arrangement for moving the tape guides 13 and 18 can use a corresponding arrangement in a second embodiment of this invention. Further, an arrangement for moving the tape guides 14 and 17 and the inclined poles 15 and 16 can use a corresponding arrangement in the second embodiment of this invention.

Second Embodiment

A second embodiment of this invention will now be described. FIGS. 6, 7, 8, 9, 10, 11, 12, and 13 show a tape loading mechanism for a magnetic recording and reproducing apparatus 10B according to a second embodiment of this invention. The embodiment of FIGS. 6–13 is similar to the embodiment of FIGS. 3–5 except for design changes indicated later.

Figure 6:
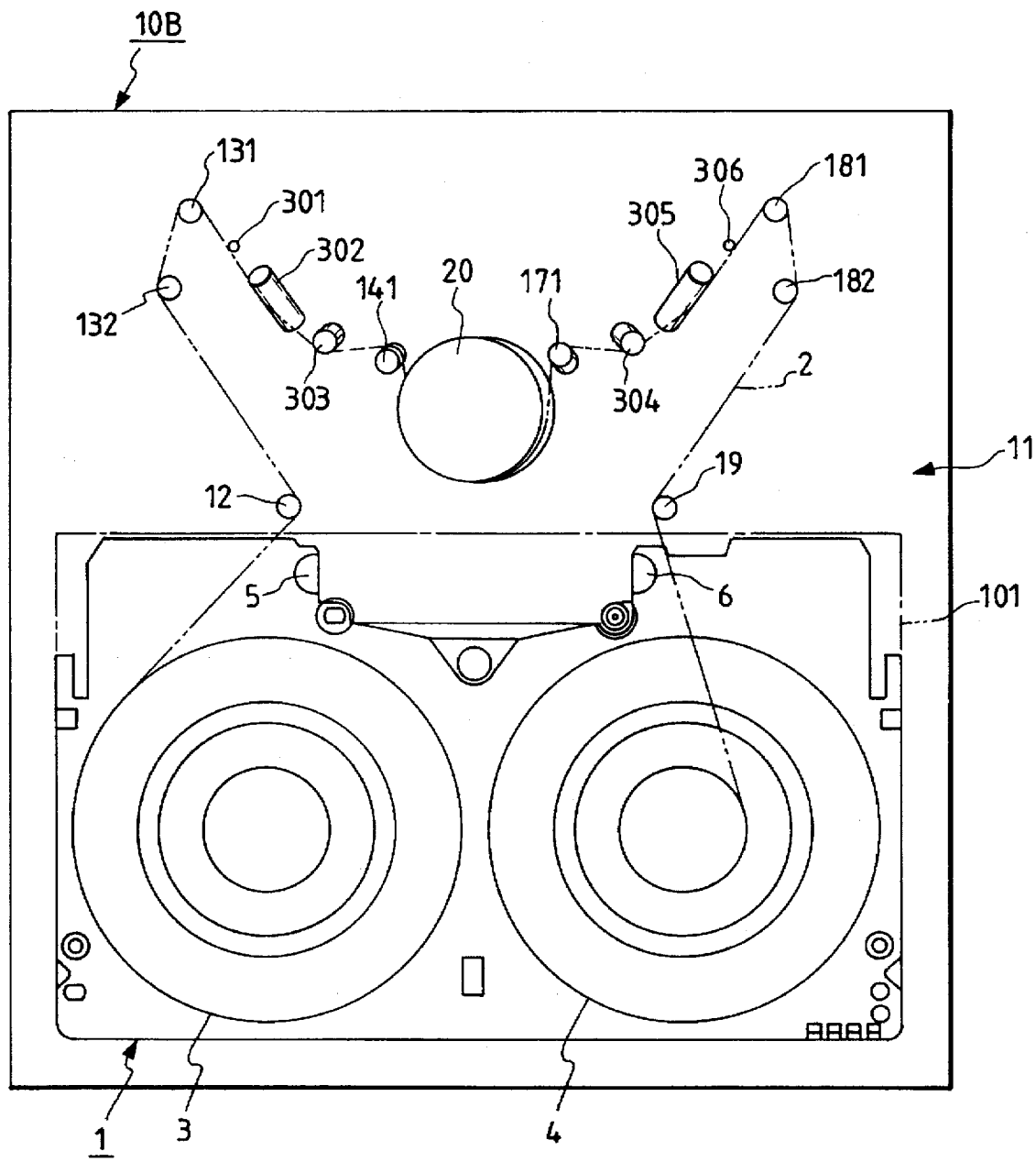
FIG. 6 is a diagram of a magnetic recording and reproducing apparatus which includes a tape loading mechanism according to a second embodiment of this invention.

With reference to FIG. 6, the magnetic recording and reproducing apparatus 10B accommodates a tape cassette 1 having a front face provided with a lid 101. The lid 101 of the tape cassette 1 can be closed and opened in a known manner.

With reference to FIGS. 6–11, a supply side of the magnetic recording and reproducing apparatus 10B includes a first tape-guiding arrangement which has tape guides 131 and 132 and a supply guide arm 133 supporting the tape guides 131 and 132.

The supply guide arm 133 is rotatably connected to a supply guide arm base 136 via a pin 137. The supply guide arm base 136 is formed integrally with a supply guide arm gear 135. The supply guide arm base 136 rotates together with the supply guide arm gear 135. The supply guide arm gear 135 is provided on a shaft 134 supported by a chassis base 11.

An end of the supply guide arm 133 has a pin 138 which serves as a cam follower. The pin 138 extends into a cam groove 139 formed in the chassis base 11. Rotation of the supply guide arm gear 135 drives the pin 138 along the cam groove 139, moving the first tape-guiding arrangement of the supply side from a position in FIG. 7 to a position in FIG. 11 via positions in FIGS. 8, 9, and 10 or moving the first tape-guiding arrangement of the supply side from a position in FIG. 11 to a position in FIG. 7 via positions in FIGS. 10, 9, and 8.

With reference to FIGS. 6–11, a take-up side of the magnetic recording and reproducing apparatus 10B includes a first tape-guiding arrangement which has tape guides 181 and 182 and a take-up guide arm 183 supporting the tape guides 181 and 182.

The take-up guide arm 183 is rotatably connected to a take-up guide arm base 186 via a pin 187. The take-up guide arm base 186 is formed integrally with a take-up guide arm gear 185. The take-up guide arm base 186 rotates together with the take-up guide arm gear 185. The take-up guide arm gear 185 is provided on a shaft 184 supported by the chassis base 11.

An end of the take-up guide arm 183 has a pin 188 which serves as a cam follower. The pin 188 extends into a cam groove 189 formed in the chassis base 11. Rotation of the take-up guide arm gear 185 drives the pin 188 along the cam groove 189, moving the first tape-guiding arrangement of the take-up side from a position in FIG. 7 to a position in FIG. 11 via positions in FIGS. 8, 9, and 10 or moving the first tape-guiding arrangement of the take-up side from a position in FIG. 11 to a position in FIG. 7 via positions in FIGS. 10, 9, and 8.

A main control cam gear 201 is rotated about a shaft 202 by a loading motor (not shown). The shaft 202 is supported on the chassis base 11. The main control cam gear 201 has a cam groove 203. A part of the main control cam gear 201 near its outer circumferential edge is provided with teeth 204. It should be noted that circumferential surfaces of the main control cam gear 201 have other teeth (not shown) for providing the connection with the loading motor.

A slide rack gear 205 has an approximately U-shaped configuration. The slide rack gear 205 has a central projection 205A provided with a pin 206 extending into the cam groove 203 in the main control cam gear 201. The pin 206 serves as a cam follower. As the main control cam gear 201 rotates, the slide rack gear 205 moves or slides between a position in FIG. 7 and a position in FIG. 11 via positions in FIGS. 8, 9, and 10. The direction of movement of the slide rack gear 205 is parallel with the chassis base 11.

Inner surfaces of opposite arms of the slide rack gear 205 have racks 205B and 205C respectively. The rack 205B meshes with the supply guide arm gear 135. The rack 205C meshes with the take-up guide arm gear 185. Rotation of the main control cam gear 201 moves the slide rack gear 205, rotating the supply guide arm gear 135 and the take-up guide arm gear 185. Rotation of the supply guide arm gear 135 moves the first tape-guiding arrangement of the supply side between first and second given positions. Rotation of the take-up guide arm gear 185 moves the first tape-guiding arrangement of the take-up side between first and second given positions.

With reference to FIGS. 6–11, the supply side of the magnetic recording and reproducing apparatus 10B includes a second tape-guiding arrangement which has a tape guide 141 and a supply loading base 142 supporting the tape guide 141. The supply loading base 142 can slide along a supply guide rail 143 fixed to the chassis base 11. A connector lever 144 connects the supply loading base 142 and a supply arm 145. Accordingly, the tape guide 141 moves in accordance with movement of the supply arm 145. The supply arm 145 is formed integrally with a supply arm gear 147 which can rotate about a shaft 146 supported by the chassis base 11.

The take-up side of the magnetic recording and reproducing apparatus 10B includes a second tape-guiding arrangement which has a tape guide 171 and a take-up loading base 172 supporting the tape guide 171. The take-up loading base 172 can slide along a take-up guide rail 173 fixed to the chassis base 11. A connector lever 174 connects the take-up loading base 172 and a take-up arm 175. Accordingly, the tape guide 171 moves in accordance with movement of the take-up arm 175. The take-up arm 175 is formed integrally with a take-up arm gear 177 which can rotate about a shaft 176 supported by the chassis base 11.

An upper idler gear 230 and a lower idler gear 231 are mounted on a shaft 232 supported by the chassis base 11. The teeth 204 on the main control cam gear 201 can move into and out of mesh with the lower idler gear 231. The upper idler gear 230 meshes with another idler gear 234 provided on a shaft 233 supported by the chassis base 11. The idler gear 234 meshes with the supply arm gear 147. The supply arm gear 147 meshes with the take-up arm gear 177. Therefore, a rotational force can be transmitted from the main control cam gear 201 to the supply arm gear 147 and the take-up arm gear 177 via the idler gears 230, 231, and 234.

Figure 7:
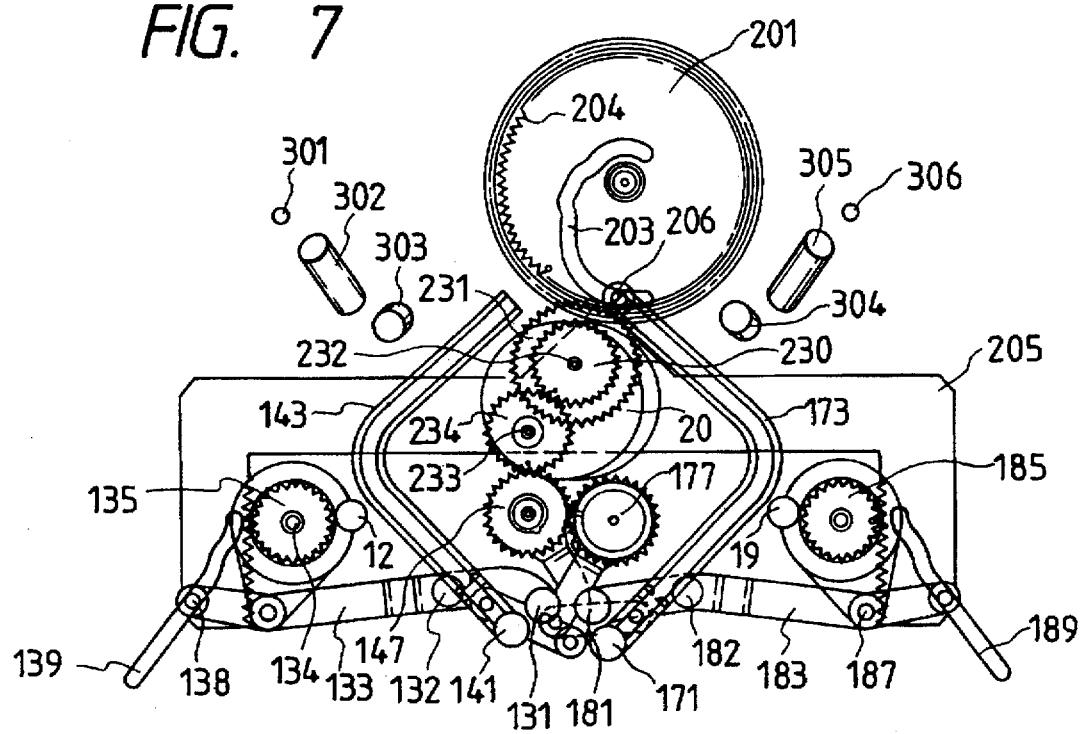
FIG. 7, FIG. 8, FIG. 9, FIG. 10, and FIG. 11 are diagrams of a portion of the magnetic recording and reproducing apparatus in FIG. 6 which are in different states respectively.
Figure 8:
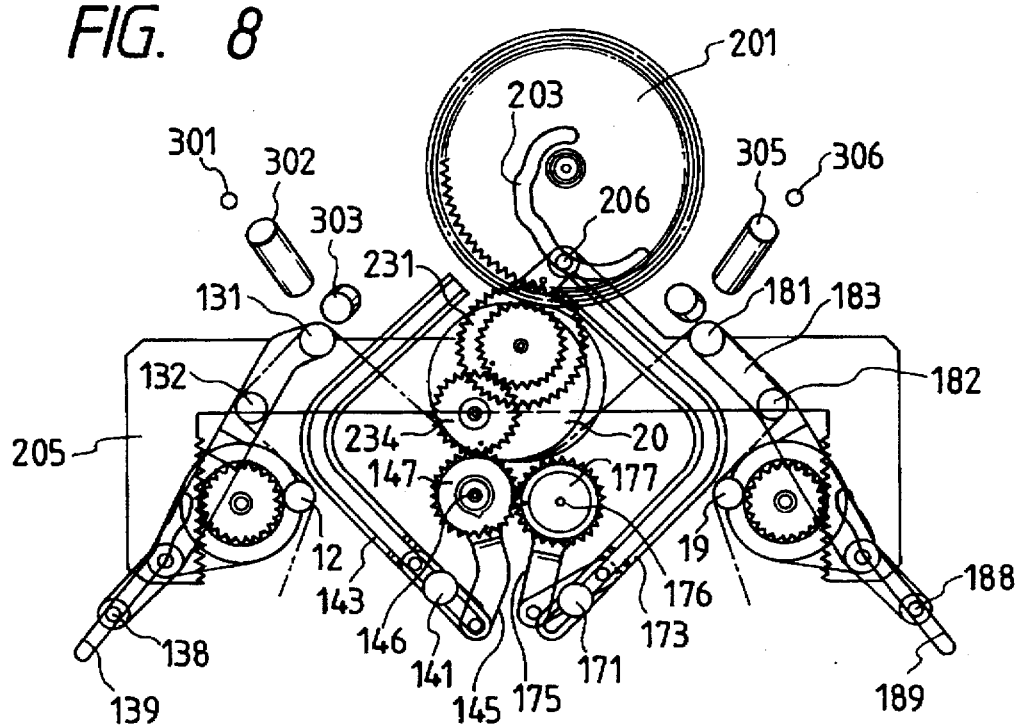

FIG. 7 shows tape unloading conditions corresponding to a stop mode of operation of the magnetic recording and reproducing apparatus 10B. When the tape cassette 1 is placed into the magnetic recording and reproducing apparatus 10B, the lid 101 of the tape cassette 1 is opened in a known way. In addition, the loading motor (not shown) becomes active so that the main control cam gear 201 rotates counterclockwise.

The counterclockwise rotation of the main control cam gear 201 moves the slide rack gear 205 upwards as viewed in FIG. 7 by operation of the combination of the cam groove 203 and the pin 206. Therefore, the rack 205B on the slide rack gear 205 rotates the supply guide arm gear 135 clockwise while the rack 205C thereon rotates the take-up guide arm gear 185 counterclockwise.

As the supply guide arm gear 135 rotates clockwise, the pin 138 on the supply guide arm 133 moves along the guide groove 139 so that the supply guide arm 133 rotates counterclockwise. As the take-up guide arm gear 185 rotates counterclockwise, the pin 188 on the take-up guide arm 183 moves along the guide groove 189 so that the take-up guide arm 183 rotates clockwise. The tape guides 131 and 132 of the supply side move from their first given positions toward their second given positions in accordance with the counterclockwise rotation of the supply guide arm 133. The tape guides 181 and 182 of the take-up side move from their first given positions toward their second given positions in accordance with the clockwise rotation of the take-up guide arm 183. The movements of the tape guides 131, 132, 181, and 182 from their first given positions can drive a magnetic tape 2 out of the tape cassette 1.

As shown in FIG. 7, during an initial stage of the counterclockwise rotation of the main control cam gear 201, the teeth 204 on the main control cam gear 201 remain out of mesh with the lower idler gear 231 so that the lower idler gear 231 continues to be stationary. Therefore, the tape guide 141 of the supply side and the tape guide 171 of the take-up side remain at initial positions (first given positions).

As the main control cam gear 201 further rotates counterclockwise, the slide rack gear 205 further moves upward. The further movement of the slide rack gear 205 causes the tape guides 131, 132, 181, and 182 to contact the magnetic tape 2 and to force the magnetic tape 2 out of the tape cassette 1. As a result of the further counterclockwise rotation of the main control cam gear 201, the teeth 204 on the main control cam gear 201 fall into mesh with the lower idler gear 231 (see FIG. 8).

Figure 9:
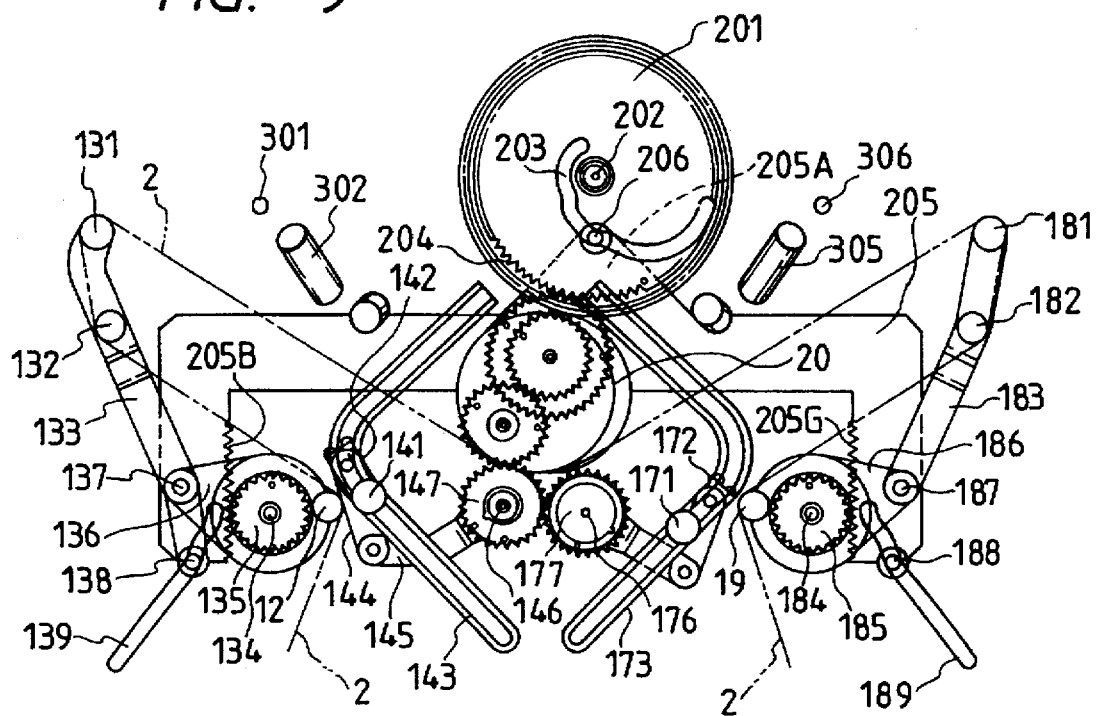

As the main control cam gear 201 further rotates counterclockwise, the slide rack gear 205 further moves upward. The further movement of the slide rack gear 205 causes the tape guides 131, 132, 181, and 182 to further draw the magnetic tape 2 from the tape cassette 1. In addition, a rotational force is transmitted from the main control cam gear 201 to the supply arm 145 and the take-up arm 175 via the upper idler gear 230, the idler gear 234, the supply arm gear 147, and the take-up arm gear 177. Thus, the supply arm 145 rotates clockwise while the take-up arm 175 rotates counterclockwise. As shown in FIG. 9, the tape guide 141 of the supply side moves upward along the supply guide rail 143 in accordance with the clockwise rotation of the supply arm 145. Simultaneously, the tape guide 171 of the take-up side moves upward along the take-up guide rail 173 in accordance with the counterclockwise rotation of the take-up arm 175. Under the conditions shown in FIG. 9, the tape guide 141 of the supply side and the tape guide 171 of the take-up side do not yet contact the magnetic tape 2 since the magnetic tape 2 has been sufficiently moved out of the tape cassette 1.

Figure 10:
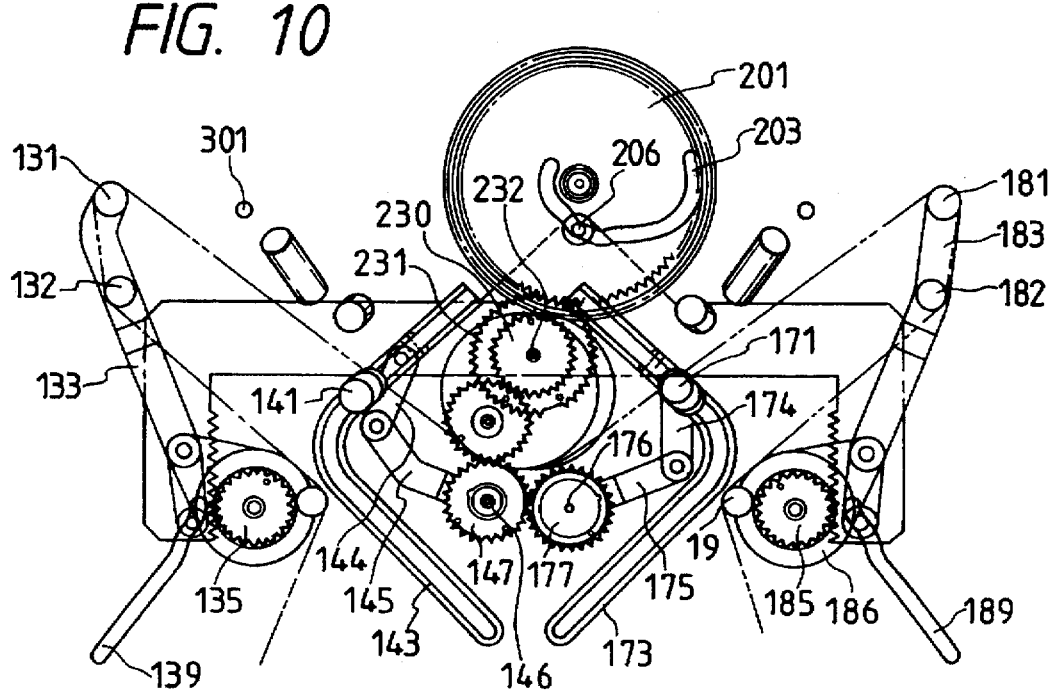
Figure 11:
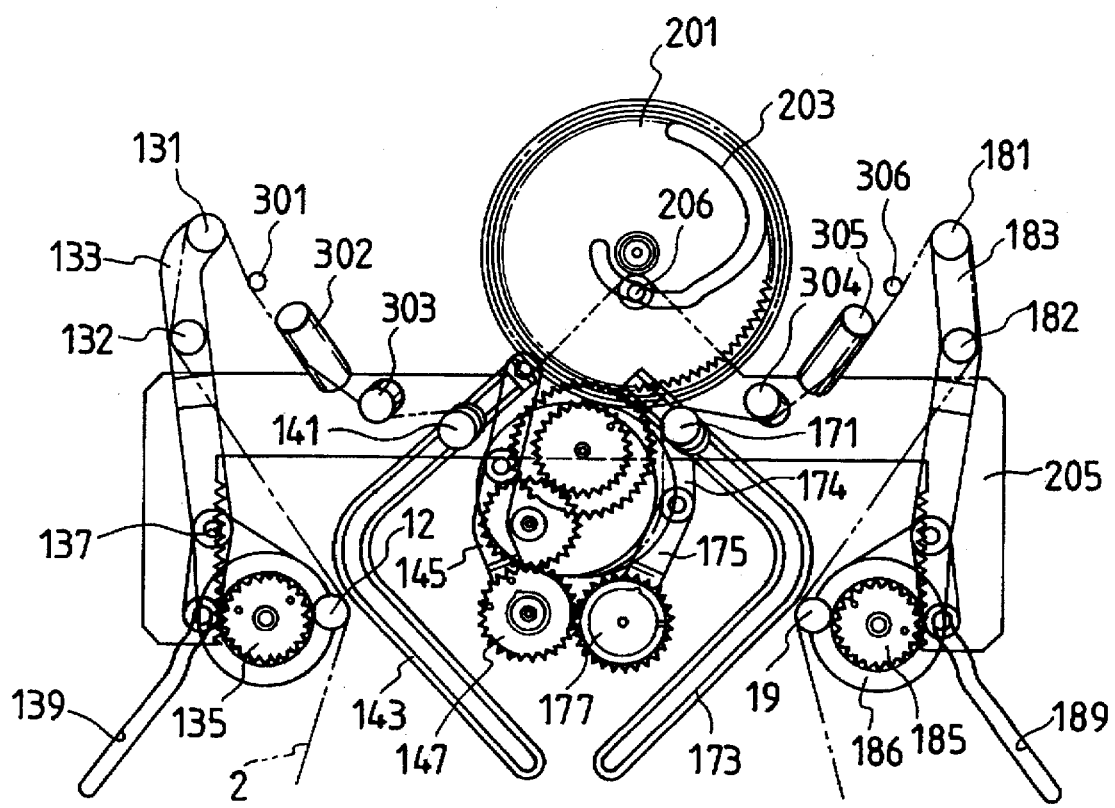

As the main control cam gear 201 further rotates counterclockwise, the slide rack gear 205 further moves upward. The counterclockwise rotation of the main control cam gear 201 further moves the slide rack gear 205 upwards. Therefore, the rack 205B on the slide rack gear 205 rotates the supply guide arm gear 135 clockwise while the rack 205C thereon rotates the take-up guide arm gear 185 counterclockwise. The shape of the cam groove 139 is designed so that the clockwise rotation of the supply guide arm gear 135 causes clockwise rotation of the supply guide arm 133 about the pin 137. In addition, the shape of the cam groove 189 is designed so that the counterclockwise rotation of the take-up guide arm gear 185 causes counterclockwise rotation of the take-up guide arm 183 about the pin 187. Therefore, as shown in FIG. 10, the tape guides 131, 132, 181, and 182 are slightly moved back from their second given positions (their outermost positions). The shape of the loop formed by the portion of the magnetic tape 2 outside the tape cassette 1 changes in accordance with the backward movements of the tape guides 131, 132, 181, and 182. As in the embodiment of FIGS. 3–5, the length of the magnetic tape 2 between a supply reel 3 and a take-up reel 4 remains substantially equal to a given length of value L. On the other hand, the tape guide 141 of the supply side and the tape guide 171 of the take-up side continue to move upward in accordance with the further counterclockwise rotation of the main control cam gear 201. Therefore, as shown in FIG. 10, the tape guide 141 of the supply side and the tape guide 171 of the take-up side contact the magnetic tape 2.

As previously described, the counterclockwise rotation of the main control cam gear 201 causes the tape guide 141 of the supply side to move upward along the supply guide rail 143, and also causes the tape guide 171 of the take-up side to move upward along the take-up guide rail 173. Accordingly, the magnetic tape 2 is forced or moved by the tape guides 141 and 171, being wrapped in a helix around a rotary drum 20 through an angular range of 180 degrees or more (see FIG. 11). The shape of the loop formed by the portion of the magnetic tape 2 outside the tape cassette 1 changes in accordance with the movements of the tape guides 141 and 171. As in the embodiment of FIGS. 3–5, the length of the magnetic tape 2 between the supply reel 3 and the take-up reel 4 remains substantially equal to the given length of value L.

Figure 12:
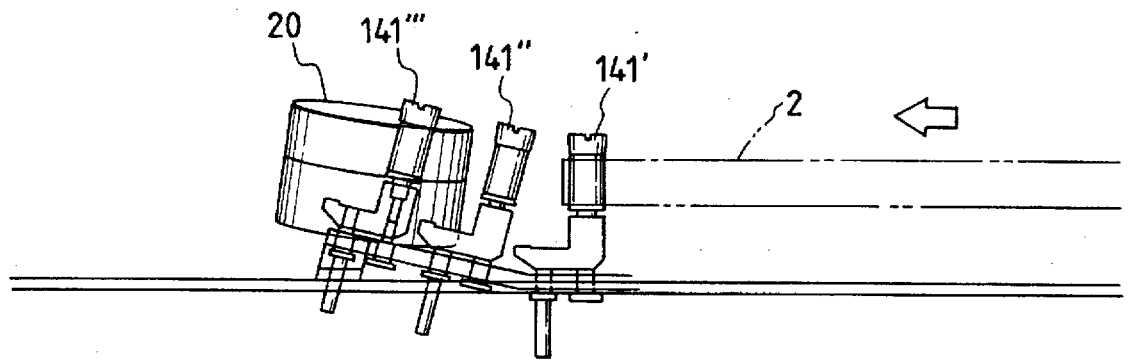
FIG. 12 is a diagram of a portion of the magnetic recording and reproducing apparatus in FIG. 6.
Figure 13:
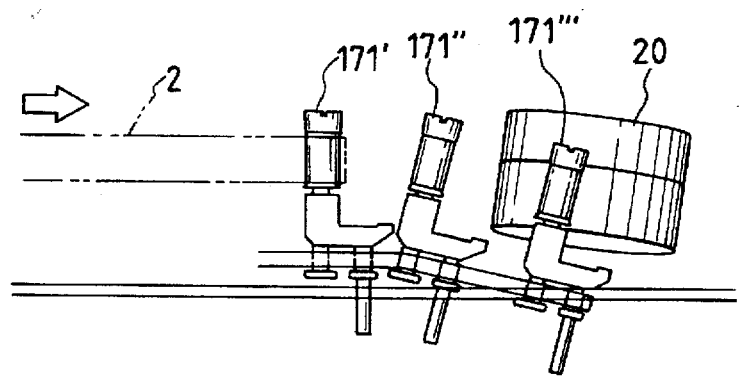
FIG. 13 is a diagram of a portion of the magnetic recording and reproducing apparatus in FIG. 6.

As shown in FIGS. 12 and 13, during a former stage of the tape loading process, the tape guides 141 and 171 continue to move horizontally with respect to a reference plane defined by the chassis base 11 (that is, a flat plane of the chassis base 11). The horizontal movements of the tape guides 141 and 171 prevent the magnetic tape 2 from being subjected to a variation in a tension along a tape width direction. During a later stage of the tape loading process which corresponds to the conditions shown in FIGS. 10 and 11, the tape guide 141 of the supply side moves upward in accordance with an inclined configuration of the supply guide rail 143 while the tape guide 171 of the take-up side moves downward in accordance with an inclined configuration of the take-up guide rail 173. During the later stage of the tape loading process, the length of the magnetic tape 2 between the supply reel 3 and the take-up reel 4 remains substantially equal to the given length of value L, and hence the magnetic tape 2 is not further drawn from the tape cassette 1. Therefore, it is possible to effectively prevent the occurrence of damage to the magnetic tape 2. It should be noted that, in FIGS. 12 and 13, the characters 141', 141'', and 141''' denote different positions of the tape guide 141 respectively, and the characters 171', 171'', and 171''' denote different positions of the tape guide 171 respectively.

FIG. 6 shows conditions where the tape loading process has been completed. Under the conditions of FIG. 6, the magnetic tape 2 extends from the supply reel 3 to the rotary drum 20 while being supported by a tape guide 12, the tape guides 131 and 132, a stationary guide 301, a stationary inclined guide 302, a stationary guide 303, and the tape guide 141. In addition, the magnetic tape 2 is wrapped in a helix around the rotary drum 20 through an angular range of 180 degrees or more. Further, the magnetic tape 2 extends from the rotary drum 20 to the take-up reel 4 while being supported by the tape guide 171, a stationary guide 304, a stationary inclined guide 305, a stationary guide 306, the tape guides 181 and 182, and a tape guide 19.

What is claimed is:

1. A tape loading mechanism for an apparatus operating on a magnetic tape at least partially in a tape cassette and including a rotary drum, the mechanism comprising:

first tape guide means for drawing a specific length of the magnetic tape from the tape cassette to a first position; and second tape guide means for moving the specific length of the magnetic tape from the first position to a second position, where the specific length of the magnetic tape drawn from the tape cassette by the first tape guide means is wrapped in a helix around the rotary drum at the second position;

wherein the specific length of the magnetic tape which was drawn from the tape cassette is held substantially constant in length by the first tape guide means, which moves from a first position of the first tape guide means to a second position of the first tape guide means as the second tape guide means moves the specific length of the magnetic tape to the second position from the first position.

2. A tape loading mechanism for an apparatus operating on a magnetic tape at least partially in a tape cassette and including a rotary drum, the mechanism comprising:

first movable tape guide means for drawing a specific length of the magnetic tape from the tape cassette to a drawn position as the first tape guide means moves from a first given position to a second given position; and second movable tape guide means for contacting and moving the specific length of the magnetic tape drawn from the tape cassette by the first tape guide means to a wrap position, as the second tape guide means moves from a first given position to a second given position, wherein the specific length of the magnetic tape is wrapped in a helix around the rotary drum in the wrap position;

wherein the first tape guide means moves back from the second given position of the first tape guide means toward the first given position of the first tape guide means as the second tape guide means moves the specific length of the magnetic tape to the wrap position, thereby maintaining the specific length of the magnetic tape substantially constant in length as the portion of the magnetic tape moves from the drawn position to the wrap position.

3. The tape loading mechanism of claim 2, wherein the second tape guide means includes movable inclined poles.

* * * * *